(12) United States Patent
Hixson-Goldsmith (10) Patent No.: US 7,461,445 B2
(45) Date of Patent: Dec. 9, 2008

(54) METHOD OF MANUFACTURING A MAGNETIC HEAD WITH A DEPOSITED SHIELD

(75) Inventor: April D. Hixson-Goldsmith, Campbell, CA (US)

(73) Assignee: Hitachi Global Storage Technologies Netherlands, BV (NL)

(*) Notice: Subject to any disclaimer, the term of this patent is extended or adjusted under 35 U.S.C. 154(b) by 305 days.

(21) Appl. No.: 11/047,956

(22) Filed: Jan. 31, 2005

(65) Prior Publication Data

US 2006/0171082 A1 Aug. 3, 2006

(51) Int. Cl.
*G11B 5/127* (2006.01)
*C23F 1/00* (2006.01)

(52) U.S. Cl. .......... 29/603.07; 29/603.12; 29/DIG. 16; 216/41; 216/57; 216/62; 216/66; 438/712; 438/734

(58) Field of Classification Search ............... 29/603.07, 29/603.12, 847, DIG. 16, 603.16; 216/13, 216/57, 41, 62, 66; 438/704, 712, 734, 714; 204/192.34
See application file for complete search history.

(56) References Cited

U.S. PATENT DOCUMENTS

| 4,172,758 A | * | 10/1979 | Bailey et al. | ............... 216/41 X |
| 4,426,249 A | * | 1/1984 | Brown et al. | ............... 216/41 X |
| 6,024,884 A | | 2/2000 | Bryant et al. | |
| 6,214,737 B1 | * | 4/2001 | Lyons et al. | ............ 438/714 X |
| 2003/0058576 A1 | | 3/2003 | Honjo et al. | |
| 2004/0085684 A1 | | 5/2004 | Basra et al. | |

FOREIGN PATENT DOCUMENTS

JP 61-97870 * 5/1986 ............. 438/714 X

OTHER PUBLICATIONS

Yamada et al., "Shielded Magnetoresistive Head for High Density Recording", IEEE Transactions on Magnetics, vol. 26, No. 6, Nov. 1990, pp. 3010-3015.*

* cited by examiner

*Primary Examiner*—A. Dexter Tugbang
(74) *Attorney, Agent, or Firm*—Merchant & Gould (57) ABSTRACT

A method for fabricating a non-electroplated shield using combination patterning and devices formed thereby are disclosed. The method includes depositing a metal layer, such as CZT, removing substantially 75% of the metal layer during a first phase using at least a first removal process and removing a remaining portion of the metal layer during a second phase using at least a second removal process. The first removal process may include depositing a first patterning layer, removing substantially 75% of the metal layer by ion-mill or similar technology and stripping the first patterning layer away. The second removal process may include depositing a second patterning layer and removing the remaining portion of the metal layer using a wet-etch or other etch process and removing the second patterning layer. The deposited metal layer may have a thickness up to several μm and the edges of the shield exhibit a unique step pattern that is visible in a cross-section view of the shield.

5 Claims, 7 Drawing Sheets

METHOD OF MANUFACTURING A MAGNETIC HEAD WITH A DEPOSITED SHIELD

BACKGROUND OF THE INVENTION

1. Field of the Invention

This invention relates in general to the manufacture of magnetic heads, and more particularly to a method for fabricating a non-electroplated metal shield using combination patterning and devices formed thereby.

2. Description of Related Art

Fixed magnetic storage systems are now commonplace as a main non-volatile storage in modem personal computers, workstations, and portable computers. Storage systems are now capable of storing gigabyte quantities of digital data, even when implemented in portable computers.

As disk drive technology progresses, more data is compressed into smaller areas. Increasing data density is dependent upon read/write heads fabricated with smaller geometries capable of magnetizing or sensing the magnetization of correspondingly smaller areas on the magnetic disk. The advance in magnetic head technology has led to heads fabricated using processes similar to those used in the manufacture of semiconductor devices.

A typical disk drive is comprised of a magnetic recording medium in the form of a disk for storing information, and a magnetic read/write head for reading or writing information on the disk. The disk rotates on a spindle controlled by a drive motor and the magnetic read/write head is attached to a slider supported above the disk by an actuator arm. When the disk rotates at high speed a cushion of moving air is formed lifting the air bearing surface (ABS) of the magnetic read/write head above the surface of the disk.

The write portion of a read/write head is typically fabricated using a coil embedded in an insulator between a top and bottom magnetic layer. The magnetic layers are arranged as a magnetic circuit, with pole tips forming a magnetic gap at the air bearing surface of the head. When a data bit is to be written to the disk, the disk drive circuitry sends current through the coil creating a magnetic flux. The magnetic layers provide a path for the flux and a magnetic field generated at the pole tips magnetizes a small portion of the magnetic disk, thereby storing a data bit on the disk.

The read portion of the head is typically formed using a magnetoresistive (MR) element. This element is a layered structure with one or more layers of material exhibiting the magnetoresistive effect. The resistance of a magnetoresistive element changes when the element is in the presence of a magnetic field. Data bits are stored on the disk as small, magnetized region on the disk. As the disk passes by beneath the surface of the magnetoresistive material in the read head, the resistance of the material changes and this change is sensed by the disk drive control circuitry.

Typically, read head portions include shields, insulating layers and the above-mentioned magnetoresistive sensing layers. Shield layers have historically been fabricated using electroplated NiFe. However, other metals are needed for shield layers, and some of these other metals must be deposited by means other than electroplating. For example, the properties of some vacuum-deposited metals such as cobalt-zirconium-tantalum (CZT) make them attractive candidates for shield layers. However, the fabrication of a non-electroplated shield using typical processes presents problems due to the thickness of the material required. For example, if a relatively thick layer of metal is deposited full-film and then a patterning photo layer is applied to perform an ion mill to remove the metal from areas where the metal is not to be maintained, considerable overmill is required to clear the small features of the shield, i.e., the reader vias. This overmill would damage the underlying alumina layers below, and potentially damage the sensor buried under that alumina as well.

Alternatively, if a relatively thick layer of metal is deposited and then a photo layer is applied to perform a wet-etch, considerable over-etch is required to clear the field across all areas of the wafer. This over-etch will damage or completely remove small features that need to be retained in the final pattern such as reader vias, and potentially damage the underlying alumina or even the sensor. Moreover, a wet-etch process can have high etch variation across the water and from wafer to water, leaving some areas over-etched and others incompletely etched even on the same wafer.

A third alternative may be used wherein a resist layer is patterned with a release layer, the metal layer is deposited on top of the resist layer and then a liftoff procedure is performed to remove the metal from the field. However, the release layer must be of approximately equal thickness to the metal being patterned. This requires a relatively thick stack of patterning resist to be applied before metal deposition. This patterning resist can bubble and flow during the long metal deposition cycle. In experiments, even if the resist was thoroughly baked or "cured" before deposition, a clean deposit could not be achieved even on areas without resist. Further, small features would be obliterated by resist flow, and the bubbling can cause metal to flake off the wafer and contaminate the tool. Still further, putting resist in the metal deposition tools could cause magnetic degradation of all other materials deposited in the same chamber at a later date.

It can be seen then that there is a need for a process for fabricating a magnetic head shield compatible with using materials other than NiFe.

SUMMARY OF THE INVENTION

To overcome the limitations in the prior art described above, and to overcome other limitations that will become apparent upon reading and understanding the present specification, the present invention discloses method for fabricating a non-electroplated metal shield using combination patterning and devices formed thereby.

The present invention provides a metal shield having feature edge definition with reasonable sharpness and with little over-removal so the underlying alumina layers and the sensor are not damaged, and critical small features are defined without damage.

A method for providing a non-electroplated shield layer of a magnetic read head in accordance with an embodiment of the present invention includes depositing a metal layer, removing substantially 75% of the metal layer during a first phase using at least a first removal process and removing a remaining portion of the metal layer during a second phase using at least a second removal process.

In another embodiment of the present invention, a magnetic storage device is provided. The magnetic storage device includes magnetic media for storing data thereon, a magnetic transducer for reading and writing data on the magnetic media, a motor for translating the position of the magnetic media and an actuator for positioning the magnetic transducer relative to the magnetic media, wherein the magnetic transducer further comprises a read head, the read head further includes a read sensor, a first and second insulator layer and a first and second shield layer, wherein at least one of the first and the second shield layer includes a deposited metal layer having a step pattern visible in the cross-section of at least one of the first and the second shield layer.

In another embodiment of the present invention, a read head is provided. The read head includes a read sensor, a first and second insulator layer and a first and second shield layer, wherein at least one of the first and the second shield layer includes a deposited metal layer having a step pattern visible in the cross-section of at least one of the first and the second shield layers.

In another embodiment of the present invention, another magnetic storage device is provided. This magnetic storage device includes means for storing magnetic data thereon, means for reading and writing data on the means for storing magnetic data, means for translating the position of the means for storing magnetic data and means for positioning the means for reading and writing data relative to the means for storing magnetic data, wherein the means for reading and writing data further includes means for sensing magnetic data, first and second means for insulating the means for sensing magnetic data and a first and second means for shielding the means for sensing data, wherein at least one of the first and the second means for shielding the means for sensing data includes a deposited metal layer having a step pattern visible in the cross-section of at least one of the first and the second means for shielding the means for sensing data.

In another embodiment of the present invention, another read head is provided. This read head includes means for sensing magnetic data, first and second means for insulating the means for sensing magnetic data and a first and second means for shielding the means for sensing data, wherein at least one of the first and the second means for shielding the means for sensing data includes a deposited metal layer having a step pattern visible in the cross-section of at least one of the first and the second means for shielding the means for sensing data.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

According to an embodiment of the present invention, a method for fabricating a non-electroplated shield (with a material such as cobalt-zirconium-tantalum or CZT) using combination patterning and devices formed thereby are provided. A deposited metal shield is provided having feature edge definition with reasonable sharpness and with little over-removal so the underlying alumina gap layers and the sensor are not damaged, and critical small features are defined without damage.

Figure 1:
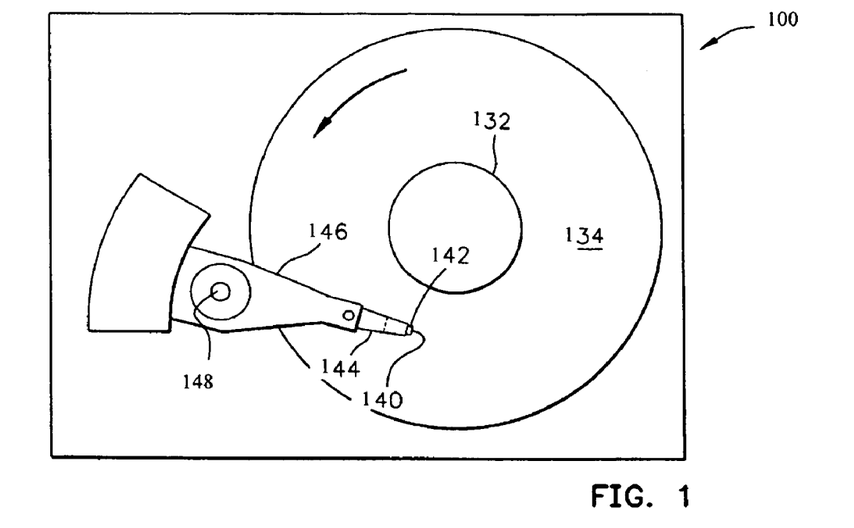
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
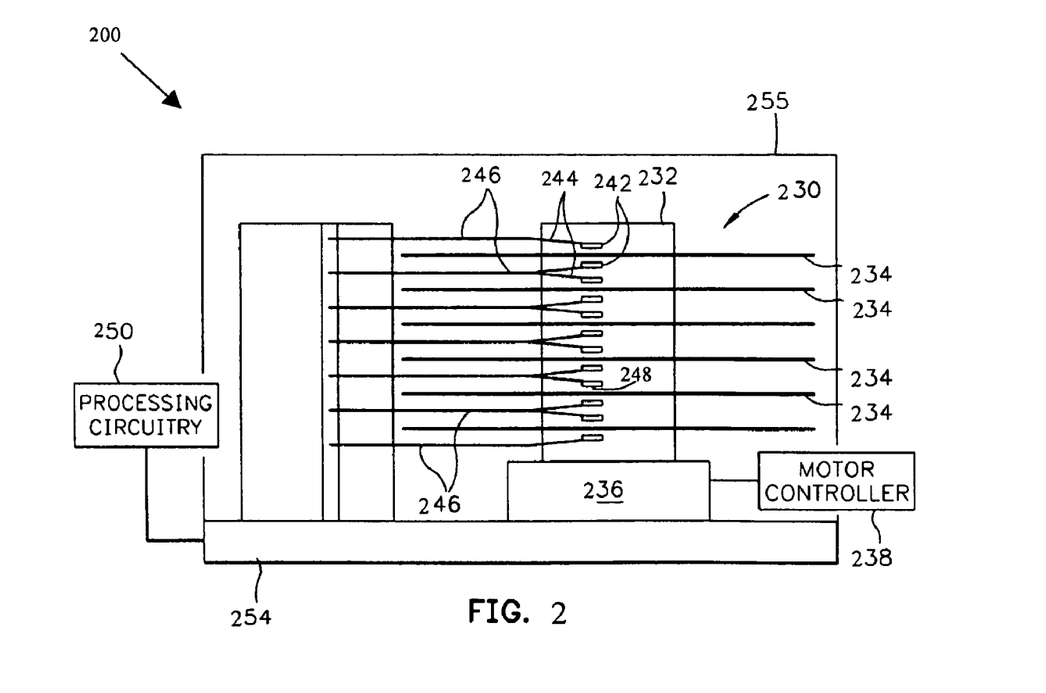
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air bearing surface (ABS) 248. The magnetic head may then be employed for writing information to multiple circular tracks on the surface of the disk 234, as well as for reading information therefrom.

Figure 3:
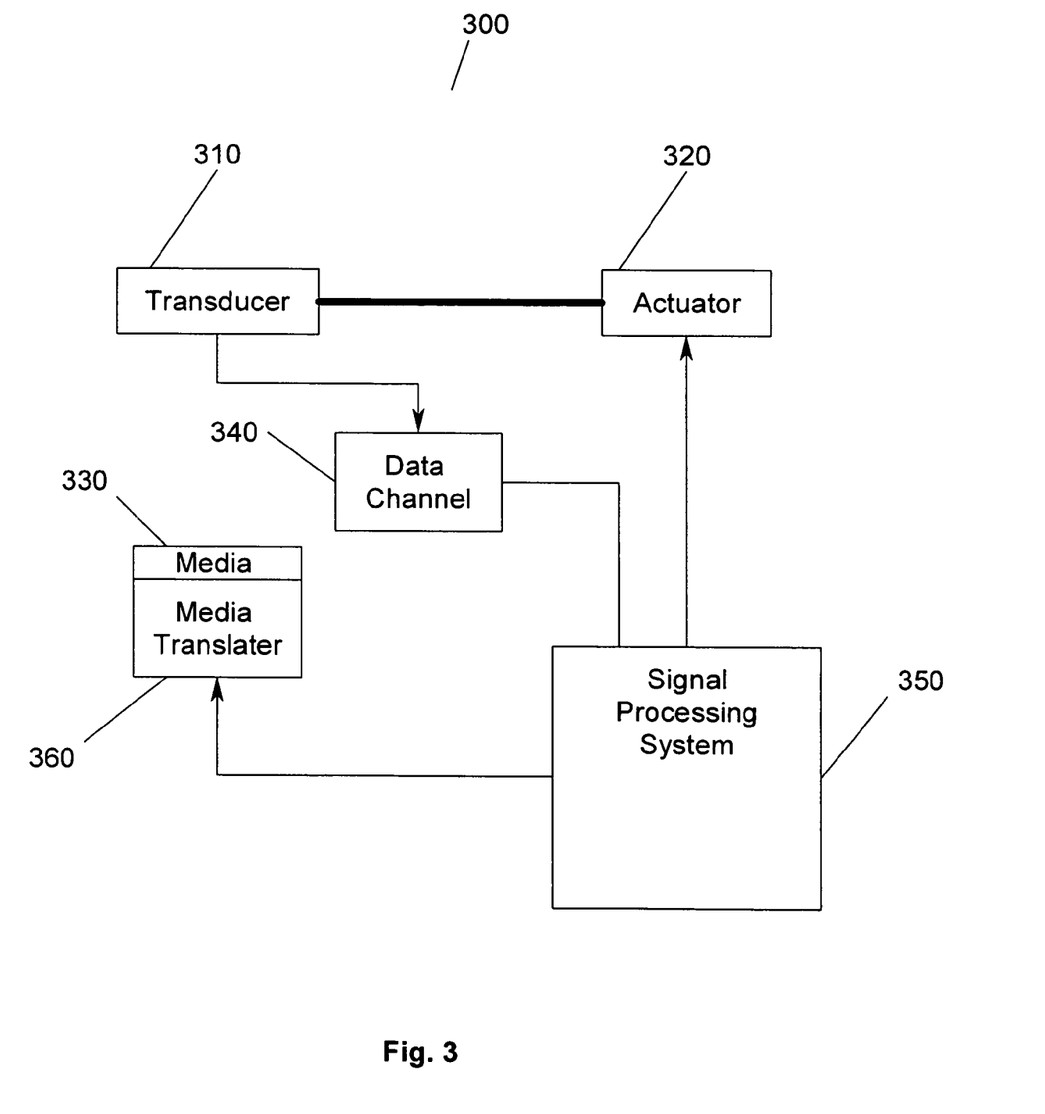
FIG. 3 illustrates a storage system according to the present invention.

FIG. 3 illustrates a storage system 300. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 4:
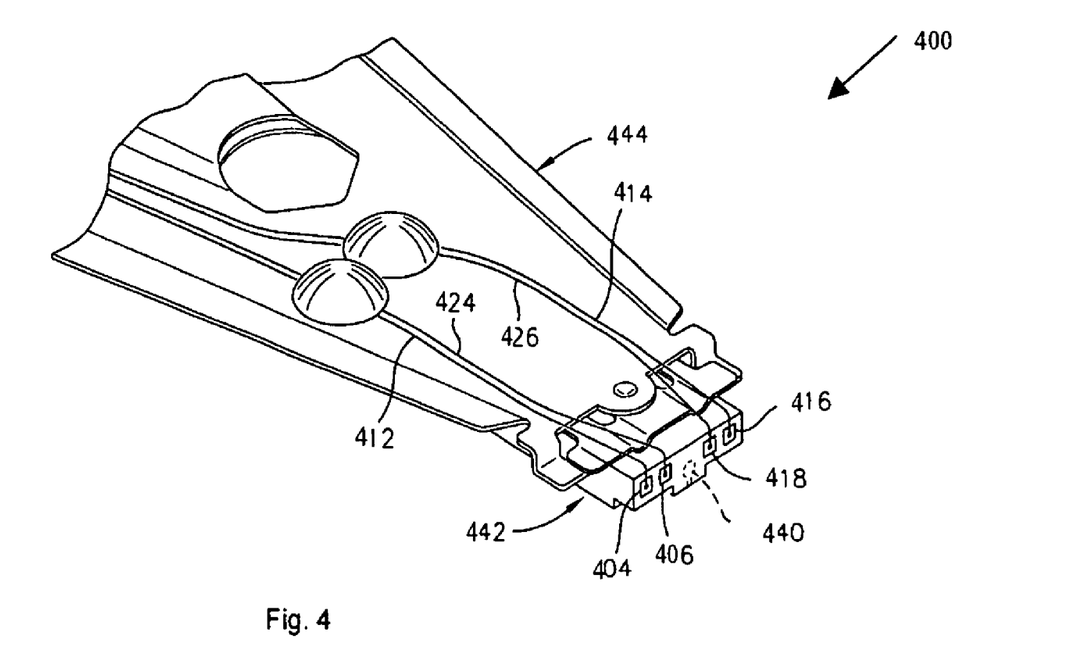
FIG. 4 is an isometric illustration of a suspension system for supporting a slider and a magnetic head.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 5A:
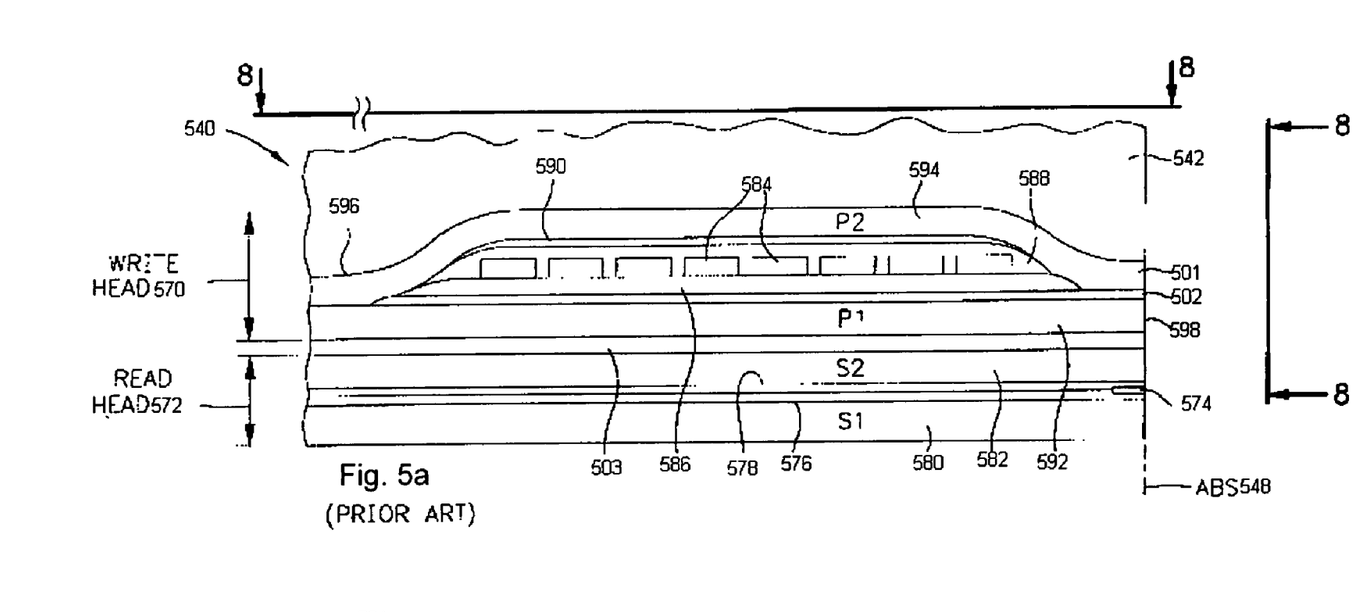
FIGS. 5a and b are side cross-sectional elevation view of a magnetic head and an ABS view of the magnetic head, respectively.
Figure 5B:
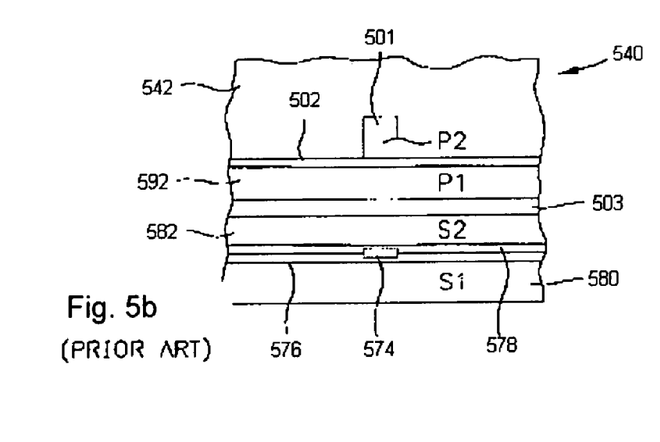

FIGS. 5a and b are side cross-sectional elevation view of a magnetic head 540 and an ABS view of the magnetic head 540, respectively. The magnetic head 540 includes a write head portion 570 and a read head portion 572. The read head portion 572 includes a sensor 574. FIG. 5b is an ABS view of the magnetic head of FIG. 5a. The sensor 574 is sandwiched between first and second gap layers 576 and 578, and the gap layers are sandwiched between first and second shield layers 580 and 582. In a piggyback head as shown in FIG. 5a, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current is conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

Figure 6:
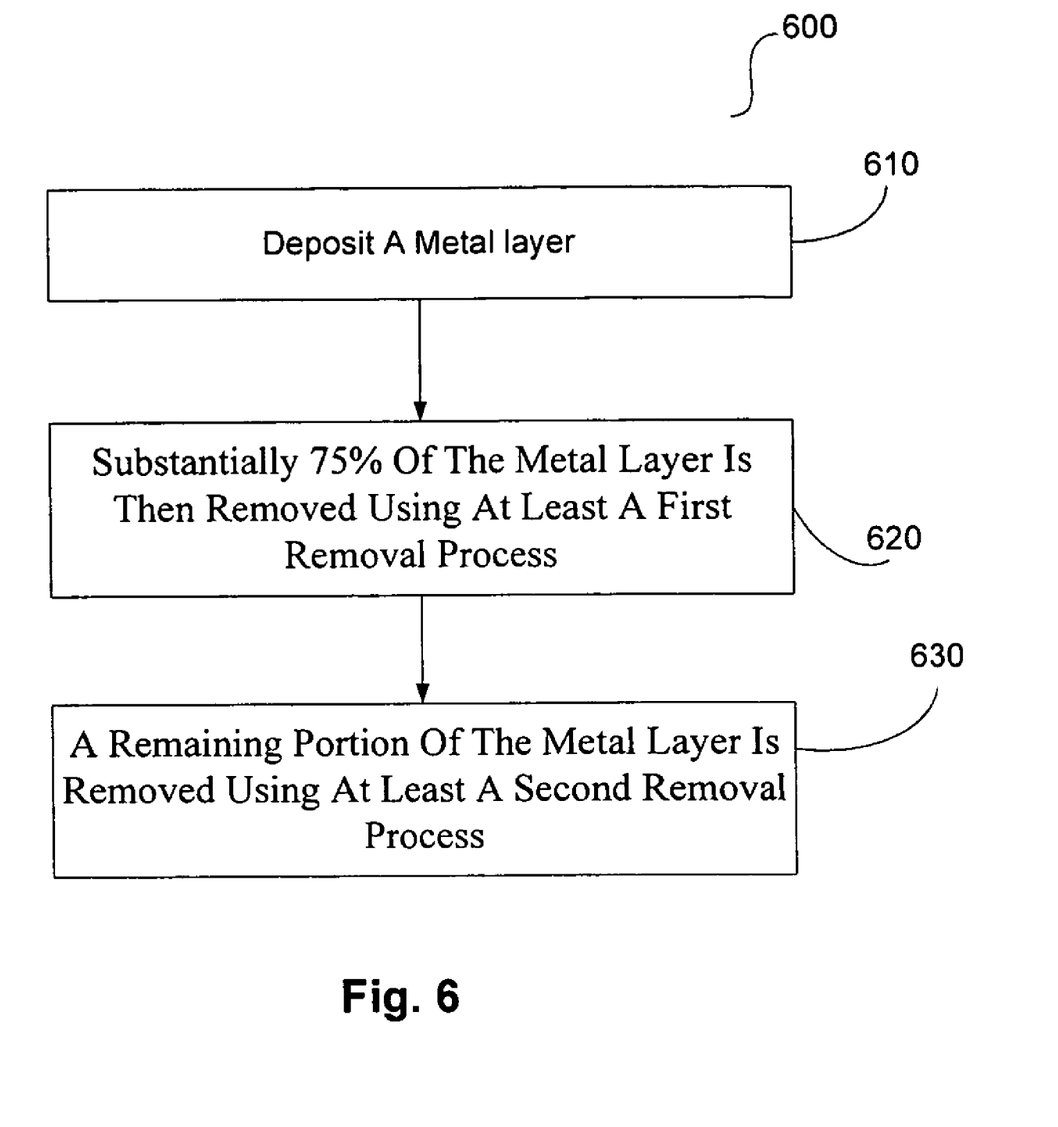
FIG. 6 illustrates a flow chart of a method for providing a non-electroplated metal shield layer for a read head in accordance with an embodiment of the invention.

FIG. 6 illustrates a flow chart of a method 600 for providing a non-electroplated metal shield layer for a read head in accordance with an embodiment of the present invention. A metal layer is first deposited 610. Substantially 75% of the metal layer is then removed during a first phase using at least a first removal process 620. The first removal process may, for example, include depositing a first patterning layer, using an ion-mill or any other technology to substantially remove 75% of the layer and removing the first patterning layer. A remaining portion of the metal layer is removed during a second phase using at least a second removal process 630. The second removal process may include depositing a second patterning layer and removing by wet-etch or any other process the remaining portion of the metal layer and removing the second patterning layer. The metal layer may have a thickness of up to several μm.

Thus, removing the exposed metal from the patterned areas is accomplished using a combination of at least two processes such as ion milling and wet-etching. A first phase including at least a first step (for example an ion mill process) allows for feature edge definition with reasonable sharpness and minimal device shape windage. A second phase including at least a second step (for example, a wet-etch process) clears the patterned area in a short simple process that is less complicated than the aforementioned liftoff procedure.

Furthermore, in an embodiment of the present invention using an ion mill process in a first phase and a wet etch in a second phase, the thinning accomplished by the first step decreases the amount of over-etch that is required, so the underlying alumina gap layers and the sensor are not damaged, and critical small features are defined without damage. When patterning, it is desirable to retain small features used in the final pattern (such as reader vias), and therefore over-removal should be avoided. Furthermore, over-milling and over-etching can damage the alumina gap 2 and gap fill below, and potentially can damage the sensor buried beneath the alumina. Combining at least two removal processes in forming a read head shield can retain the sharp edge definition of the at least first step while avoiding damage caused by the at least second step, and clear the remaining material with a quick removal procedure, e.g., a wet etch without excessive over-etch.

Figure 7A:
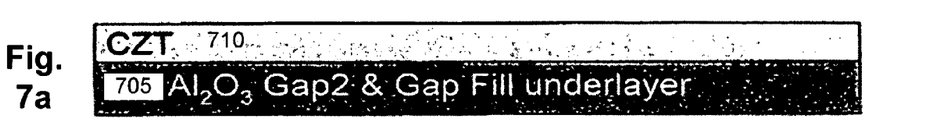
FIGS. 7a-f illustrates a shield combination patterning process in accordance with an embodiment of the invention.
Figure 7B:
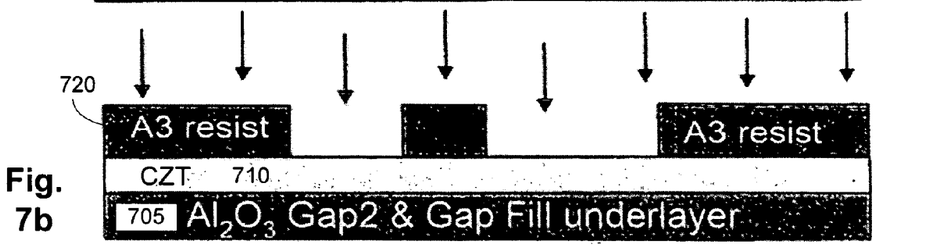
Figure 7C:
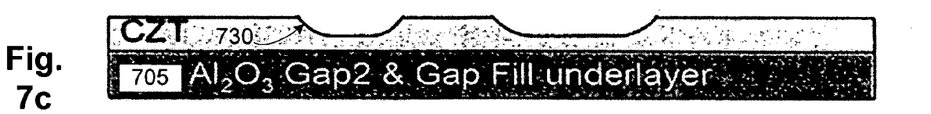
Figure 7D:
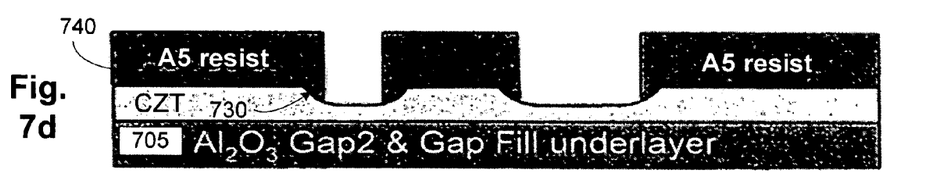
Figure 7E:
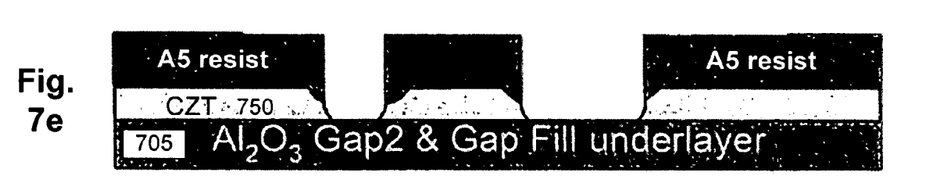
Figure 7F:
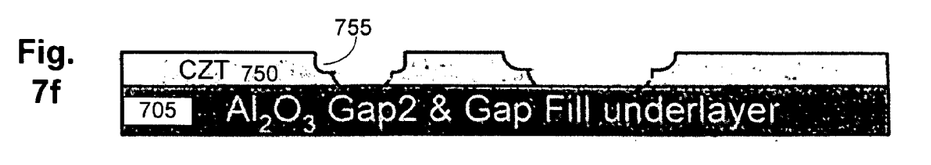

FIGS. 7a-f illustrates a shield 2 mill-etch patterning process in accordance with an embodiment of the invention. For the purposes of this example, the deposited metal is Cobalt Zirconium Tantalum, or "CZT". A deposited CZT metal layer 710 is deposited over $Al_2O_3$ gap 2 and gap fill underlayer 705. An "A3" resist layer 720 is deposited over the CZT metal layer and is patterned yielding exposed areas of the CZT layer 710. A portion less than the thickness but more than half of the thickness of the CZT layer is removed using ion milling, for example (FIG. 7b). The A3 resist layer 720 is removed, FIG. 7c, yielding a CZT metal layer with milled areas 730. The stripped CZT metal layer having milled areas 730 then undergoes a second photolithography process using an A5 resist layer 740. The A5 resist layer 740 is deposited over a portion of the milled areas so that the A5 resist layer 740 covers a larger area than the A3 resist layer 720 in the first photolithography step as can be seen in FIG. 7*d*. Wet etching removes the remainder of the thickness of the CZT metal layer having milled areas 730 at the exposed areas, FIG. 7*e*. FIG. 7*f* shows the A5 resist layer 740 being removed yielding a CZT metal layer 750 having undergone ion milling and wet etching processes. The final CZT metal layer 750 has a unique step pattern 755.

Figure 8:
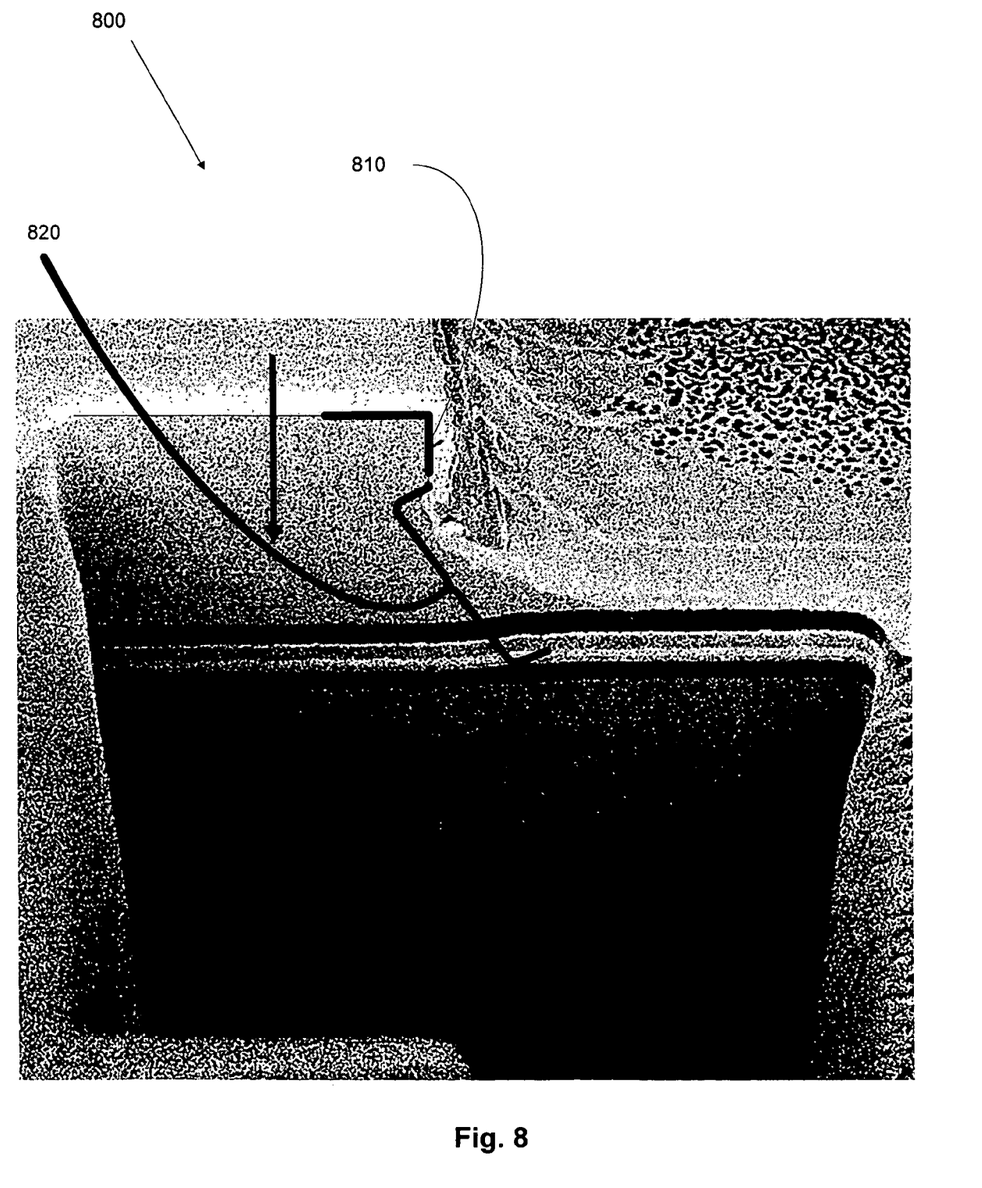
FIG. 8 illustrates cross-sectional views of edges of a deposited metal shield fabricated using a combination patterning processes in accordance with an embodiment of the present invention.

FIG. 8 illustrates cross-sectional views 800 of edges of a CZT shield fabricated using mill-etch combination processes in accordance with an embodiment of the present invention. The sharp edge 810 is defined during the first phase including at least a first step such as using an ion mill process. The edges of the shield have a unique step pattern 820 visible in the cross-section.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing a deposited metal shield layer of a magnetic read head, comprising:
    depositing a metal layer over a substrate;
    depositing a first resist mask over and in contact with the metal layer, the first resist mask allowing portions of the metal layer to be exposed;
    ion milling the metal layer to remove the exposed portions of the metal layer not being masked to produce ion milled areas in the metal layer;
    removing the first mask after ion milling the metal layer;
    depositing a second resist mask having an area larger than the first resist mask and covering portions of the ion milled areas of the metal layer and exposing other portions of the ion milled areas of the metal layer;
    etching the remaining other portions of the ion milled areas of the metal layer down to the substrate to produce a step pattern in the metal layer.

2. The method of claim 1, wherein the metal layer includes a thickness up to several μm.

3. The method of claim 1, wherein depositing the first resist mask comprises depositing an A3 photo layer.

4. The method of claim 1, wherein depositing the second resist mask comprises depositing an A5 photo layer.

5. The method of claim 1, wherein the etching the remaining other portions of the ion milled areas of the metal layer down to the substrate to produced the step pattern in the metal layer further comprises using a wet-etch to remove the remaining other portions of the ion milled areas of the metal layer.

* * * * *